(12) United States Patent
Baudesson et al.

(10) Patent No.: US 7,965,484 B2
(45) Date of Patent: Jun. 21, 2011

(54) DEVICE FOR PROTECTING A SPEED CONTROLLER AGAINST OVERCURRENT

(75) Inventors: Philippe Baudesson, La Boissiere (FR); Hocine Boulharts, Triel sur Seine (FR)

(73) Assignee: Schneider Toshiba Inverter Europe SAS, Pacy-sur-Eure (FR)

( * ) Notice: Subject to any disclaimer, the term of this patent is extended or adjusted under 35 U.S.C. 154(b) by 210 days.

(21) Appl. No.: 12/388,099

(22) Filed: Feb. 18, 2009

(65) Prior Publication Data
US 2009/0212726 A1     Aug. 27, 2009

(30) Foreign Application Priority Data
Feb. 21, 2008   (FR) ...................... 08 51101

(51) Int. Cl.
*H02H 9/08* (2006.01)
(52) U.S. Cl. ........ 361/93.9; 361/93.1; 361/90; 361/91.1
(58) Field of Classification Search .................. None
See application file for complete search history.

(56) References Cited

U.S. PATENT DOCUMENTS

| | | | | |
|---|---|---|---|---|
| 4,843,533 A | * | 6/1989 | Roof et al. ................ | 363/55 |
| 6,353,545 B1 | * | 3/2002 | Ueda .......................... | 363/40 |
| 7,113,380 B2 | * | 9/2006 | Youm ........................ | 361/91.1 |
| 7,430,101 B2 | * | 9/2008 | Komulainen et al. ....... | 361/111 |
| 7,551,462 B2 | * | 6/2009 | Uruno et al. ................ | 363/89 |
| 2004/0246641 A1 | * | 12/2004 | Sugimoto et al. ............ | 361/91.1 |
| 2006/0238940 A1 | | 10/2006 | Komulainen et al. | |
| 2007/0147099 A1 | | 6/2007 | Tai et al. | |
| 2007/0262806 A1 | | 11/2007 | Thummalapally et al. | |

FOREIGN PATENT DOCUMENTS

| | | |
|---|---|---|
| EP | 1 835 609 A1 | 9/2007 |
| EP | 1 862 348 A1 | 12/2007 |
| FR | 2 538 187 | 6/1984 |
| JP | 63-268431 | 11/1988 |

OTHER PUBLICATIONS

U.S. Appl. No. 12/388,131, dated Feb. 18, 2009, Baudesson.

* cited by examiner

*Primary Examiner* — Jared J Fureman
*Assistant Examiner* — Terrence R Willoughby
(74) *Attorney, Agent, or Firm* — Oblon, Spivak, McClelland, Maier & Neustadt, L.L.P.

(57) ABSTRACT

The invention relates to a speed controller comprising:
- a rectifier module (12) for generating a direct voltage on a power bus (10, 11) from an alternating voltage available on an electrical power-supply network (A);
- a bus capacitor (Cb) connected between a positive line and a negative line of the power bus; and
- an inverter module (13) powered by the power bus and controlled to deliver an alternating voltage to an electrical load (2);
- a protection device (14) for protecting the controller against overcurrents linked with voltage variations on the electrical power-supply network (A).

15 Claims, 1 Drawing Sheet

DEVICE FOR PROTECTING A SPEED CONTROLLER AGAINST OVERCURRENT

BACKGROUND OF THE INVENTION

I. Field of the Invention

The present invention relates to a speed controller equipped with a device for protection against the overcurrents generated by the overvoltages or undervoltages on the electrical power-supply network.

II. Discussion of Background

In a known manner, a speed controller is connected to the electrical power-supply network and intended to control an electric load. It comprises a voltage rectifier module as input that converts an alternating voltage provided by the electrical network into a direct voltage and which feeds downstream a power bus equipped with a positive line and a negative line. A filter capacitor, commonly called the bus capacitor, is mounted between a positive terminal and a negative terminal of the power bus. As output the controller comprises an inverter module fed by the power bus, enabling generation, from the direct voltage, of an alternating voltage which may be of variable amplitude and frequency by using electronic switches, for example IGBT transistor switches controlled by Pulse Width Modulation (PWM).

The electrical power-supply network may undergo various types of disturbance such as overvoltages or undervoltages. The disturbances may be of high amplitude and short duration, hence weakly energizing, or of low amplitude and long duration, hence highly energizing. If the disturbances are highly energizing, some components of the controller such as the diodes of the rectifier module, the bus capacitor or the transistors of the inverter module may be damaged.

SUMMARY OF THE INVENTION

The aim of the invention is therefore to propose a speed controller enabling the disturbances to the electrical network to be absorbed without damage.

This aim is attained by a speed controller comprising:
- as input, a rectifier module for generating a direct voltage on a power bus from an alternating voltage available on an electrical power-supply network;
- a bus capacitor connected between a positive line and a negative line of the power bus; and
- an inverter module powered by the power bus and controlled to deliver an alternating voltage to an electrical load;
- characterized in that:
- the controller comprises a protection device for protecting the controller against overcurrents linked with voltage variations on the electrical power-supply network;
- and in that the device comprises:
- a first electronic switch located on the power bus in series between the rectifier module and the bus capacitor;
- a first resistor mounted in parallel with the first electronic switch;
- an assembly comprising a second electronic switch and a second resistor mounted in series, said assembly being mounted in parallel with the first electronic switch and the first resistor;
- control means for controlling the first electronic switch and the second electronic switch.

According to a particular feature, the protection device is mounted on the positive line of the power bus.

The first electronic switch is preferably a normally-on JFET transistor, made of a material with a high band-gap energy such as silicon carbide.

According to a particular feature, the control means for controlling the JFET transistor are connected between the positive line and the negative line of the power bus. These control means comprise, for example, a charge pump circuit capable of applying a control voltage to the JFET transistor.

The second electronic switch is preferably of the normally-off type. These control means for controlling the second electronic switch comprise a charge pump circuit capable of applying a control voltage to the second electronic switch.

According to the invention, the control means comprise memory means storing a threshold value for the voltage measured at the terminals of the JFET transistor above which the JFET transistor is switched off by the control means. The memory means also store a predetermined duration at the end of which, if the voltage measured at the JFET transistor terminals remains greater than the threshold value, the second electronic switch is switched on. The memory means may store a threshold value for the voltage measured between the positive line and the negative line of the power bus above which the second electronic switch is switched on.

Preferably, the controller additionally comprises a device for protecting the rectifier module against overvoltages. This device for protecting the rectifier module against overvoltages comprises, for example, a normally-on JFET limiting transistor and a Zener diode, both connected in parallel between the positive line and the negative line of the power bus. In a variant, the device for protecting the rectifier module against overvoltages comprises a GMOV varistor connected between the positive line and the negative line of the power bus.

BRIEF DESCRIPTION OF THE DRAWING

Other features and advantages will appear in the detailed description that follows, referring to an embodiment given by way of example and represented by the appended drawings in which.

DETAILED DESCRIPTION OF THE INVENTION

Figure 1:
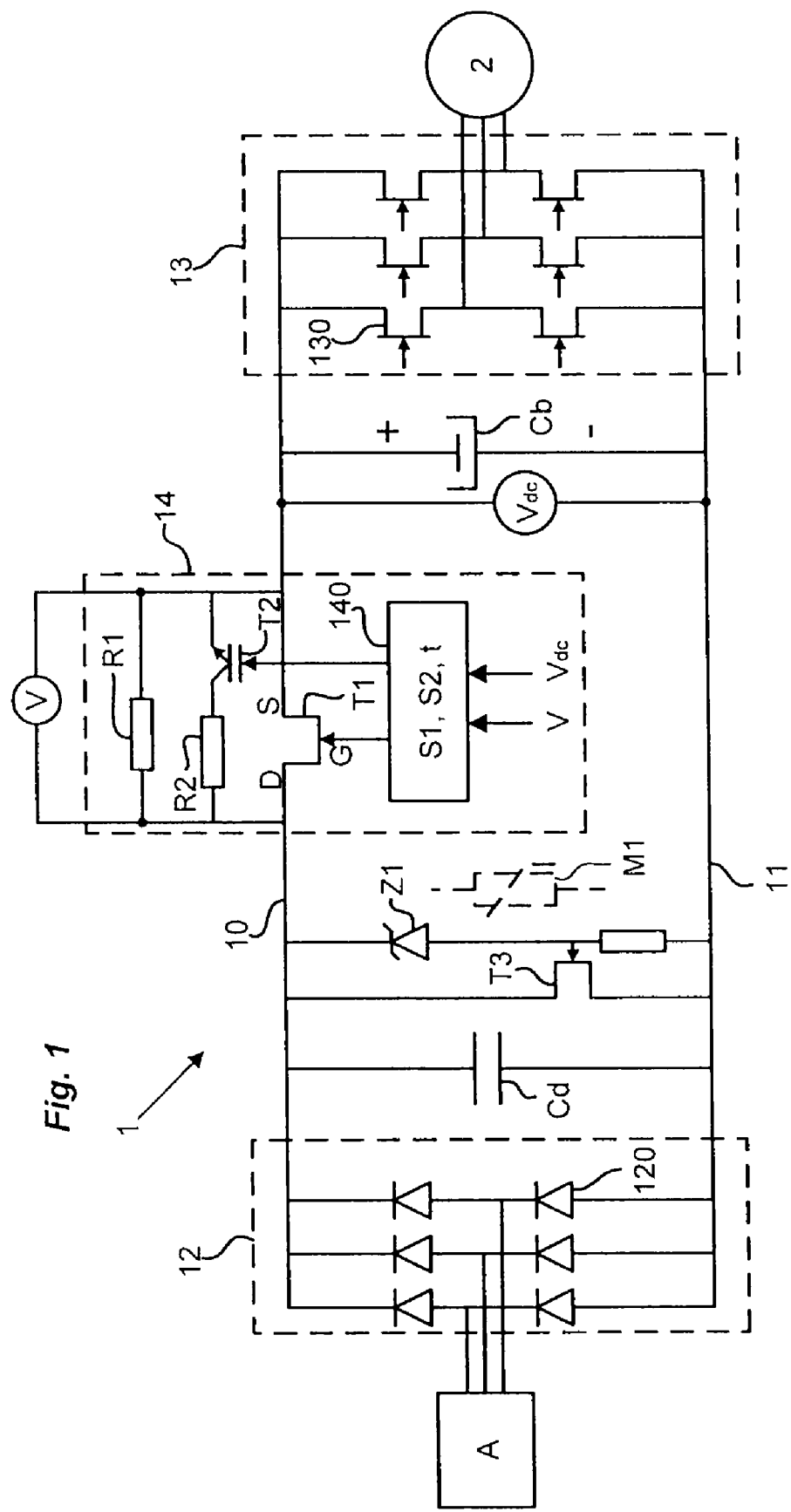
FIG. 1 shows in a simplified manner a speed controller equipped with a protection device of the invention.

With reference to FIG. 1, a speed controller 1 comprises a direct voltage source which supplies a power bus with a direct voltage Vdc (for example of around 200 to 800 Vcc or more, according to the conditions of use). The power bus is composed of a positive line 10 and of a negative line 11. A bus capacitor Cb is usually used to keep the direct voltage Vdc of the power bus constant. This bus capacitor Cb is connected between a positive terminal and a negative terminal of the power bus and is generally an electrolytic capacitor.

In FIG. 1, the controller 1 comprises a rectifier module 12 as input which is intended to rectify a three-phase alternating voltage coming from an external power supply network A (for example a three-phase 380 Vac electrical network). This rectifier module 12 advantageously uses diodes 120 which are more economical and more reliable than thyristors.

The speed controller 1 next comprises an inverter module 13 as output, enabling, from the power bus, control of an electrical load 2 with an alternating voltage that may be of variable amplitude and frequency. To do this, the inverter module 13 uses control by Pulse Width Modulation (PWM) to control the electronic power switches 130 mounted over each phase. These switches are power transistors, for example IGBT power transistors, controlled by a control module (not shown in the FIGURE). In FIG. 1, the inverter module 13 comprises three branches for delivering a three-phase alternating voltage to the electrical load 2, each branch being equipped with two power transistors in series between a positive terminal and a negative terminal of the power bus, or a total of six power transistors.

The invention consists in putting a protection device 14 in the controller in order to protect it against overcurrents linked with variations in voltage on the electrical power-supply network A.

These overcurrents may be generated by two different phenomena:
- during an overvoltage a strong current surge is produced in the bus capacitor Cb, which may cause damage to the diode bridge of the rectifier module 12, and a high overvoltage on the power bus, which may cause damage to the inverter module 13 and to the bus capacitor Cb;
- when returning to normal after an undervoltage a strong current surge is also produced in the bus capacitor Cb, which may cause damage to the diode bridge of the rectifier module 12.

It is therefore necessary to limit the current surge in the rectifier module 12 in order to preserve it during an overvoltage or after an undervoltage appearing on the network A.

To do this, the device 14 of the invention comprises in particular a first electronic switch, for example a normally-off or normally-on JFET, MOSFET or IGBT electronic switch.

The first electronic switch is preferably made of a material with a high band-gap energy (also called a wide band-gap material), i.e. having a low resistance in the conducting state $R_{dson}$ and capable of withstanding high voltages (greater than 1000 V), such as silicon carbide or gallium nitride (GaN) for example.

This first electronic switch is preferably of the JFET type. A JFET transistor is a known electronic power switch that comprises a control gate (G) whose function is to permit or not to permit a current to pass between a drain (D) and a source (S). Such a transistor is said to be of the "normally on" type if the voltage $V_{GS}$ between the gate and the source is close to zero. This means that the drain-source path is conducting in the absence of a control voltage $V_{GS}$. Conversely, a JFET transistor is said to be of the "normally off" type if the drain-source path is not conducting in the absence of a voltage $V_{GS}$ between the gate and the source.

In addition, it turns out that a normally-on JFET transistor offers better performance than other types of voltage-controlled electronic power switches, such as MOSFETs, IGBTs or even normally-off JFET switches. Specifically, such a switch has in particular the advantages of being faster at switching, of generating less conduction losses in the conducting state (low resistance $R_{DSon}$ in the conducting state), of having better behaviour at temperature and of having a smaller size.

The protection device 14 of the invention therefore preferably comprises a normally-on JFET transistor T1, made of a material with a high band-gap energy such as silicon carbide or gallium nitride for example. The transistor T1 is mounted on the positive line 10 of the power bus between the rectifier module 12 and the bus capacitor Cb. The device 14 also comprises a first resistor R1 mounted in parallel with the transistor T1 and an assembly consisting of a second resistor R2 and a second electronic switch in series, this assembly being mounted in parallel with the transistor T1 and the first resistor R1. The second electronic switch is, for example, a normally-off IGBT transistor T2.

The first resistor has a high value, of the order of several tens of ohms, for example 70 ohms (for a 4 kW controller from 100 ohms to 10 ohms), while the second resistor has a low value, of the order of a few ohms, for example 3 ohms (for a 4 kW controller from 5 ohms to 0.5 ohms).

The device of the invention furthermore comprises control means 140 for controlling the transistor T1 and the transistor T2. These control means 140 comprise in particular processing means for deciding the switching of the transistors T1 and T2, memory means for storing various threshold values, a power supply intended to control the transistor T1 and a power supply intended to control the transistor T2. The power supplies employed are, for example, charge pump circuits which comprise, for example, a capacitor that charges from the power bus when the circuit is precharging and a Zener diode mounted in parallel with the capacitor. The source for the charge pump circuit intended to control the electronic transistor T2 is the drain from the transistor T1, while the source for the charge pump circuit of the transistor T1 is the source of the transistor T1. It is also possible to use isolated external power supplies to control the transistors T1 and T2, but in this case the control means 140 are no longer supplied directly from the power bus and the circuit is therefore no longer autonomous. In this case, it is possible to conceive using a normally-off transistor T1 and positioning the protection device 14 of the invention on the negative line 11 of the power bus, between the rectifier module 12 and the bus capacitor Cb.

The controller 1 furthermore comprises a decoupling capacitor Cd connected between the positive line 10 and the negative line 11 of the power bus, downstream of the rectifier module 12 and upstream of the protection device 14. This decoupling capacitor Cd serves to clip, for a limited duration, the high overvoltages appearing on the electrical power-supply network A.

Depending on whether the controller 1 is being precharged on starting, undergoing a network overvoltage or an undervoltage, the protection device 14 of the controller 1 operates in the following manner:

On Starting:

The transistor T1 is initially conducting. Its resistance in the conducting state (Rdson) is very low. The voltage V measured at the terminals of the transistor T1 is therefore also very low. The transistor T2 is initially off.

The transistor T1 becomes limiting as soon as the current passing through it becomes greater than its limiting current. The limiting current is sufficient to charge the two capacitors of the charge pump circuits of the transistors T1 and T2. Once the capacitor of the charge pump circuit of the transistor T1 is charged, the control means 140 apply a voltage to control the switching of T1 in order to charge the bus capacitor Cb via the first resistor R1. The first resistor R1 has a high value, which enables the bus capacitor Cb to be charged slowly and to fulfill the function of a precharge circuit. If the voltage Vdc at the terminals of the bus capacitor is greater than a stored first threshold value S1, for example 250 volts, it is possible to control the switching on of the transistor T2 to accelerate the charging of the bus capacitor Cb, the second resistor R2 in series with T2 having a lower value than that of the first resistor R1. This latter functionality is optional in the device of the invention. It is of interest in the case in which the bus capacitor Cb has a high capacitance.

When the voltage V measured at the terminals of the transistor T1 is once again zero, this means that the starting is terminated. Specifically, if the voltage V measured at the terminals of the transistor T1 is zero, this means that current is no longer passing through the first resistor R1 or the second resistor R2 and therefore that the bus capacitor Cb is completely charged. The control means can then control the switching on of the transistor T1 by cutting off its power and control the switching off of T2 if the "bus capacitor rapid charge" functionality has been used.

Network Overvoltage

When an overvoltage is produced on the electrical power-supply network A, a strong current surge is produced in the bus capacitor Cb. The current flowing through the transistor T1 therefore increases rapidly until the transistor T1 becomes limiting. The resistance of the transistor T1 increases in order to limit the current, which causes an increase in the voltage V measured at the terminals of the transistor T1. If the voltage V at the terminals of the transistor T1 exceeds a second stored threshold value S2, fixed for example at 3 volts, then the control means apply a control voltage to the transistor T1 in order to switch it off. In this situation the current then flows via the first resistor R1 which is then subjected to the effects of the overvoltage. When the overvoltage has ended, the voltage measured at the terminals of the transistor T1 passes back below the second threshold value S2 and the control means then switch the transistor T1 on by cutting off its power supply. It is possible to reduce the maximum limiting current by lowering the second threshold value S2. The transistor T1 is then switched off before it becomes limiting, the voltage at its terminals being proportional to the product of its resistance in the conducting state and the current passing through it.

Network Undervoltage

During an undervoltage on the power-supply network of the controller, the transistor T1 is switched on and the bus capacitor Cb discharges if an electrical load 2 is present on the inverter or does not discharge if no electrical load 2 is present on the inverter. After the end of the undervoltage, during the return to a normal voltage, no current surge is produced if the bus capacitor Cb has not been discharged. Conversely, if the bus capacitor Cb has discharged during the undervoltage in order to power the electrical load 2, the bus capacitor must be recharged during the return to a normal voltage, which produced a strong current surge. In order to protect the controller components, the transistor T1 becomes limiting, which causes the increase in the voltage V measured at the terminals of the transistor T1. When the voltage V at the terminals of the transistor T1 exceeds the second threshold value S2 defined above, for example 3 volts, the control means switch the transistor T1 off. The current then passes through the first resistor R1. If there is an electrical load 2 on the inverter, all the current necessary to power the load 2 and to recharge the bus capacitor Cb then passes through the first resistor R1, which causes gradual heating of the first resistor R1. If the voltage V measured at the terminals of the transistor T1 remains greater than the second threshold value S2 for at least a predetermined stored duration t, for example 2-3 milliseconds, the control means 140 switch the transistor T2 on in order to accelerate the charging of the bus capacitor Cb by passing current via the second resistor R2. This is because if the voltage V at the terminals of the transistor T1 remains greater than the second threshold value S2 for a certain time, this means that the controller is not undergoing a conventional temporary overvoltage but a return to normal after an undervoltage. When the voltage V measured at the terminals of the transistor T1 passes back below the second threshold value S2, the control means 140 switch the transistor T1 on.

The above description of the various control sequences is carried out starting with a protection device equipped with a normally-on transistor T1. However, it should be understood in the same way with the use of a normally-off transistor T1. However, in this case, a specific isolated power supply is necessary in the control means in order to control the normally-off transistor T1.

According to the invention, this device is will suited when the controller 1 does not comprise any filter choke (DC choke) on the power bus and when the bus capacitor has a high value capacitance (for example, greater than 80 µF par kW).

However, this solution alone has the disadvantage of creating a great variation in intensity (high di/dt) at the rectifier module 12 when the transistor T1 is switched off during an overvoltage. The input inductances or the line inductance (not shown in FIG. 1) of the controller 1 then undergo a strong transient overvoltage, which may cause the diode bridge of the rectifier module 12 to break.

In order to dissipate the energy thus produced, it is possible to use the avalanche characteristic of the transistor T1. The transistor T1 then automatically becomes conducting if the voltage V at its terminals exceeds its avalanche threshold. If the voltage at the terminals of the bus capacitor reaches 700 volts and as the diodes of the rectifier module are provided to endure a voltage of 1600 volts, the transistor T1 must, for example, be designed with an avalanche threshold fixed at 800 volts. However, the transistor T1 must also be designed in order to be able to absorb a large amount of energy coming from the network A.

In a variant, in order to dissipate the energy produced it is possible, preferably, to add, in parallel with the decoupling capacitor Cd, a GMov varistor M1 (shown in dotted lines) or a normally-off JFET transistor T3 provided in parallel with a Zener diode Z1. The transistor T3 will, for example, be switched on by using its avalanche characteristic or using a specific control.

The invention claimed is:

1. A speed controller comprising:
   as input, a rectifier module for generating a direct voltage on a power bus from an alternating voltage available on an electrical power-supply network;
   a bus capacitor connected between a positive line and a negative line of the power bus; and
   an inverter module powered by the power bus and controlled to deliver an alternating voltage to an electrical load;
   the speed controller including a protection device for protecting the speed controller against overcurrents linked with voltage variations on the electrical power-supply network, the device including
   a first electronic switch located on the power bus in series between the rectifier module and the bus capacitor;
   a first resistor mounted in parallel with the first electronic switch;
   an assembly including a second electronic switch and a second resistor mounted in series, said assembly being mounted in parallel with the first electronic switch and the first resistor; and
   control means for controlling the first electronic switch and the second electronic switch.

2. The speed controller according to claim 1, wherein the protection device is mounted on the positive line of the power bus.

3. The speed controller according to claim 1 or 2, wherein the first electronic switch is a JFET transistor.

4. The speed controller according to claim 3, wherein the JFET transistor is made of silicon carbide.

5. The speed controller according to claim 3, wherein the JFET transistor is normally on.

6. The speed controller according to claim 3, wherein the control means for controlling the JFET transistor are connected between the positive line and the negative line of the power bus.

7. The speed controller according to claim 6, wherein the control means include a charge pump circuit configured to apply a control voltage to the JFET transistor.

8. The speed controller according to claim 1, wherein the second electronic switch is of a normally-off type.

9. The speed controller according to claim 8, wherein the control means for controlling the second electronic switch include a charge pump circuit configured to apply a control voltage to the second electronic switch.

10. The speed controller according to claim 3, wherein the control means include memory means storing a threshold value for a voltage measured at terminals of the JFET transistor above which the JFET transistor is switched off by the control means.

11. The speed controller according to claim 10, wherein the memory means store a predetermined duration at the end of which, if a voltage measured at the JFET transistor terminals remains greater than the threshold value, the second electronic switch is switched on.

12. The speed controller according to claim 1, wherein the control means include memory means storing a threshold value for a voltage measured between the positive line and the negative line of the power bus above which the second electronic switch is switched on.

13. The speed controller according to claim 1, further comprising:
a device for protecting the rectifier module against overvoltages.

14. The speed controller according to claim 13, wherein the device for protecting the rectifier module against overvoltages includes a normally-on JFET limiting transistor and a Zener diode, both connected in parallel between the positive line and the negative line of the power bus.

15. The speed controller according to claim 13, wherein the device for protecting the rectifier module against overvoltages includes a GMOV varistor connected between the positive line and the negative line of the power bus.

* * * * *